US011463516B2

(12) United States Patent
May et al.

(10) Patent No.: US 11,463,516 B2
(45) Date of Patent: Oct. 4, 2022

(54) SYSTEM, METHOD, AND COMPUTER PROGRAM FOR DISTRIBUTED APPLICATION EXECUTION USING A CLUSTER OF MOBILE DEVICES (71) Applicant: Amdocs Development Limited, Limassol (CY)

(72) Inventors: Pavel Yefim May, Rishon leZion (IL); Alexander Krasnostavsky, Kfar-Saba (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/915,661

(22) Filed: Jun. 29, 2020

(65) Prior Publication Data

US 2021/0409491 A1 Dec. 30, 2021

(51) Int. Cl.
H04L 67/1087 (2022.01)
H04W 4/80 (2018.01)
H04L 41/22 (2022.01)
H04L 67/04 (2022.01)
H04W 84/18 (2009.01)
H04W 88/02 (2009.01)

(52) U.S. Cl.
CPC .......... *H04L 67/1093* (2013.01); *H04L 41/22* (2013.01); *H04L 67/04* (2013.01); *H04W 4/80* (2018.02); *H04W 84/18* (2013.01); *H04W 88/02* (2013.01)

(58) Field of Classification Search
CPC ..... H04L 67/1093; H04L 41/22; H04L 67/04; H04W 4/80; H04W 84/18; H04W 88/02
See application file for complete search history.

(56) References Cited

U.S. PATENT DOCUMENTS

| 9,467,494 | B1* | 10/2016 | Mahalingaiah | ......... H04L 67/32 |
| 10,061,620 | B2* | 8/2018 | Gandhi | ................ G06F 9/5061 |
| 2010/0058451 | A1* | 3/2010 | Paramasivam | ..... H04L 67/1027 726/7 |
| 2014/0137186 | A1* | 5/2014 | Greenlee | ................ G06F 21/60 726/3 |
| 2014/0244834 | A1* | 8/2014 | Guedalia | ................ H04W 4/21 709/224 |
| 2016/0072917 | A1 | 3/2016 | Huang et al. | |

(Continued)

FOREIGN PATENT DOCUMENTS

EP     1556995 A2     7/2005
WO     2015200544 A1  12/2015

OTHER PUBLICATIONS

Zhu et al., "A Low Latency Clustering Method for Large-Scale Drone Swarms", IEEE Access, vol. 7, IEEE Publishing, Dec. 2019.*

(Continued)

*Primary Examiner* — Todd L Barker
(74) *Attorney, Agent, or Firm* — Zilka-Kotab, P.C.

(57) ABSTRACT

A system, method, and computer program are provided for distributed application execution using a cluster of mobile devices. In use, a wireless computing device included in a wireless mesh network of wireless computing devices identifies a wireless distributed application deployed to the wireless computing devices. Further, the wireless computing device manages execution of the wireless distributed application across the wireless computing devices.

9 Claims, 8 Drawing Sheets

(56) References Cited

U.S. PATENT DOCUMENTS

| | | | | |
|---|---|---|---|---|
| 2017/0344388 | A1* | 11/2017 | Ramos da Rocha | ........................ G06F 9/44505 |
| 2018/0367212 | A1* | 12/2018 | Reis | ................... H04B 7/18513 |
| 2019/0089778 | A1 | 3/2019 | Vicente et al. | |

OTHER PUBLICATIONS

Gotenna Pro, "goTenna Pro ProX," go Tenna, 2020, 4 pages, retrieved from https://gotennapro.com/products/gotenna-pro-x.

Sonnet Labs Inc., "Sonnet," Sonnet Labs Inc., 2018, 4 pages, retrieved from https://www.sonnetlabs.com/.

Serval, "The Serval Project Wiki," Serval, Mar. 4, 2018, 3 pages, retrieved from http://developer.servalproject.org/dokuwiki/doku.php.

Rancher, "What Rancher adds to Kubernetes," Rancher, Jan. 2020, 6 pages, retrieved from https://web.archive.org/web/20200129165116/https://rancher.com/what-is-rancher/what-rancher-adds-to-kubernetes/.

Wikipedia, "Wireless Network," Wikipedia, Jun. 12, 2020, 12 pages, retrieved from https://en.wikipedia.org/wiki/Wireless_network.

Wikipedia, "List of cluster management software," Wikipedia, Jun. 2020, 2 pages, retrieved from https://en.wikipedia.org/wiki/List_of_cluster_management_software.

Github, "Android Containerization," GitHub, Inc., 2020, 4 pages, retrieved from https://github.com/clondroid.

Github, "docker-android," GitHub, Inc., Feb. 12, 2018, 4 pages, retrieved from https://github.com/Malinskiy/docker-android.

K3S, "Lightweight Kubernetes," K3S, Rancher, 2020, 4 pages, retrieved from https://k3s.io/.

Aufranc, J., "K3s Lightweight Kubernetes Distribution Targets Low Resources x86 and Arm Platforms," CNX Software, Mar. 8, 2019, 7 pages, retrieved from https://www.cnx-software.com/2019/03/08/k3s-lightweight-kubernetes-distribution-x86-arm/.

Kerner, S., "Kubernetes Gets Smaller With K3S Project for the Edge," eWeek, Feb. 26, 2019, 3 Pages, retrieved from https://www.eweek.com/cloud/kubernetes-gets-smaller-with-k3s-project-for-the-edge.

Netspot, "WiFi Direct: WiFi Without the Internet," NetSpot, 2020, 10 pages, retrieved from https://www.netspotapp.com/what-is-wifi-direct.html.

Hazelcast, "Open Source Storage and Computing at In-Memory Speeds," Hazelcast, Inc., 2020, 12 pages, retrieved from https://hazelcast.org/.

Android Developers, "Save data using SQLite," Google Developers, 2020, 10 pages, retrieved from https://developer.android.com/training/data-storage/sqlite#DefineContract.

Shankland, S., "Wi-Fi 6 will upgrade your workhorse wireless network," c/net, Aug. 27, 2019, 6 pages, retrieved from https://www.cnet.com/news/wi-fi-6-will-upgrade-your-workhorse-wireless-network/.

Gotenna Pro, "Military," go Tenna, 2020, 4 pages, retrieved from https://gotennapro.com/pages/use-case-military.

Simonite, T., "Build Your Own Internet with Mobile Mesh Networking," MIT Technology Review, Jul. 9, 2013, 10 pages, retrieved from https://www.technologyreview.com/2013/07/09/15717/build-your-own-internet-with-mobile-mesh-networking/.

Serval, "Serval Mesh Extender," Serval, 2018, 2 pages, retrieved from http://developer.servalproject.org/dokuwiki/doku.php?id=content:meshextender:main_page.

International Search Report and Written Opinion from PCT Application No. PCT/IB2021/055459, dated Nov. 23, 2021.

Ferrer et al., "Towards the Decentralised Cloud: Survey on Approaches and Challenges for Mobile, Ad hoc, and Edge Computing," ACM Computing Surveys, vol. 51, No. 6, Jul. 2019, 36 pages.

Yaqoob et al., "Mobile ad hoc cloud: A survey" Wireless Communications and Mobile Computing, vol. 16, 2016, pp. 2572-2589.

* cited by examiner

SYSTEM, METHOD, AND COMPUTER PROGRAM FOR DISTRIBUTED APPLICATION EXECUTION USING A CLUSTER OF MOBILE DEVICES

FIELD OF THE INVENTION

The present invention relates to distributed computing.

BACKGROUND

Distributed computing generally refers to a model where components of a software program or system are shared among multiple processing systems (e.g. computers) to improve the efficiency and performance related to execution of the software. For example, in distributed computing, the processing systems may execute portions of the software in parallel. Thus, distributed computing optimizes remote data processing.

To date, distributed computing has oftentimes relied on use of an application service unit (ASU) architecture and appropriate management for a cluster of containerized applications, such as a Kubernetes stack, Docker Swarm, etc. While this approach satisfies the demand for some remote centralized computing, it is not appropriate in scenarios of various distributed applications where Internet coverage is not available.

There is thus a need for addressing these and/or other issues associated with the prior art.

SUMMARY

A system, method, and computer program are provided for distributed application execution using a cluster of mobile devices. In use, a wireless computing device included in a wireless mesh network of wireless computing devices identifies a wireless distributed application deployed to the wireless computing devices. Further, the wireless computing device manages execution of the wireless distributed application across the wireless computing devices.

DETAILED DESCRIPTION

Figure 1:
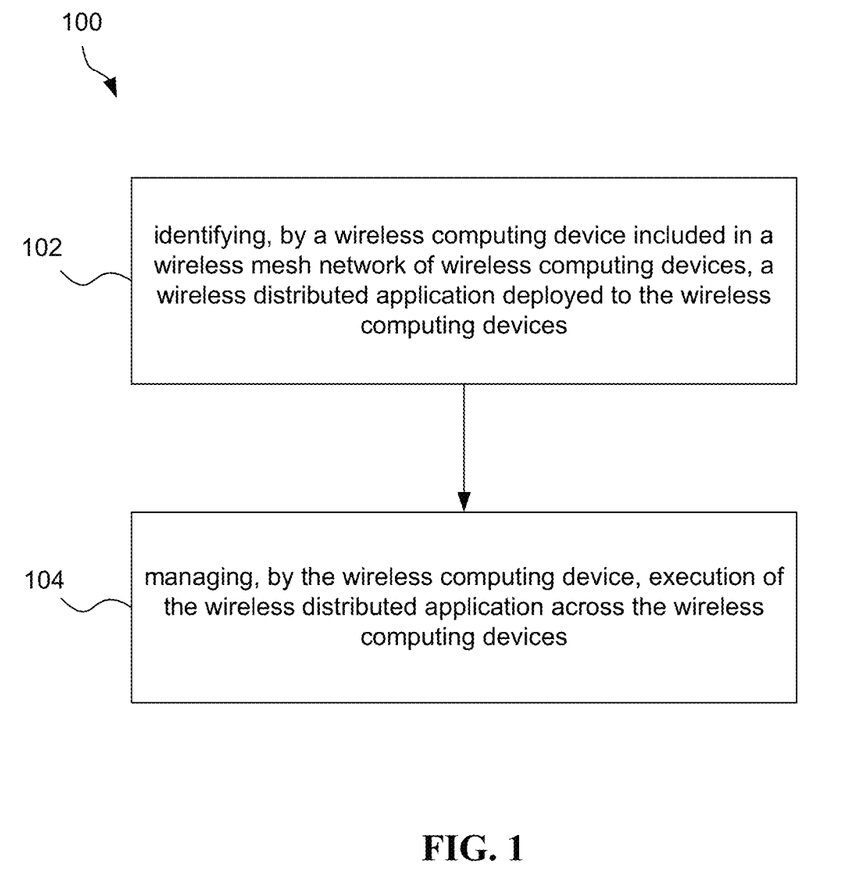
FIG. 1 illustrates a method for distributed application execution using a cluster of mobile devices, in accordance with one embodiment.

FIG. 1 illustrates a method for distributed application execution using a cluster of mobile devices, in accordance with one embodiment. In the context of the present description, the cluster of mobile devices are wireless computing devices included in a wireless mesh network. The wireless computing devices may be mobile phones, tablets, laptops, and/or any other computing devices configured to wirelessly connect to one another.

In one embodiment, the wireless mesh network may use a wireless technology to connect the wireless computing devices. The wireless technology may be Wi-Fi, Bluetooth, Zigbee, etc. In one embodiment, the wireless computing devices may be within a particular vicinity of one another to enable connection via the wireless technology. In another embodiment, the wireless computing devices may be in a geographical location that does not support access to the Internet.

As shown in operation 102, a wireless computing device included in the wireless mesh network identifies a wireless distributed application deployed to the wireless computing devices. In one embodiment, the wireless computing device that identifies the wireless distributed application may be designated as a manager of the wireless distributed application. For example, the wireless computing device may include a cluster manager application that identifies the wireless distributed application for management thereof, as described below.

The wireless distributed application is any application (e.g. software, program, etc.) for which distributed computing is enabled. For example, the wireless distributed application may include a plurality of components (e.g. application service units (ASUs), microservices, program modules, etc.), which may be configured to communicate with one another. Further, one or more of the components may be configured to operate in parallel with one another. The wireless distributed application may be an end user application, in which case the wireless computing devices may make the wireless distributed application available for use by one or more consumers (e.g. end users of the wireless computing devices). In another embodiment, the wireless distributed application may be a background application that is used by the wireless computing devices or other computing systems for a particular purpose.

As noted above, the wireless distributed application is deployed to the wireless computing devices. In other words, the wireless distributed application may be installed, to, or stored on, the wireless computing devices for execution thereof by the wireless computing devices. In one embodiment, each of the wireless computing devices may include an entirety of the wireless distributed application.

In another embodiment, only a single component of the wireless distributed application may be deployed to each of the wireless computing devices. For example, each of the wireless computing devices may have a different one of the components of the wireless distributed application. As another option, multiple instances of a same component of the wireless distributed application may be deployed to multiple of the wireless computing devices.

Further, as shown in operation 104, the wireless computing device manages execution of the wireless distributed application across the wireless computing devices. The wireless computing device may use the cluster manager application to manage the execution of the wireless distributed application. In one embodiment, the wireless computing device (e.g. the cluster manager application thereof) may include a user interface that allows a user of the wireless computing device to control one or more aspects of the management of the execution of the wireless distributed application. In another embodiment, the wireless computing device (e.g. the cluster manager application thereof) may include computer code that automatically controls one or more aspects of the management of the execution of the wireless distributed application (e.g. based on predefined rules, policies, etc.).

In one embodiment, the management of the wireless distributed application may include monitoring the wireless distributed application. In another embodiment, the management of the wireless distributed application may include determining a status of the wireless distributed application, and presenting the status of the wireless distributed application (e.g. in a user interface of the wireless computing device or the cluster manager application of the wireless computing device). As an option, the status may be determined based on the monitoring of the wireless distributed application. In yet another embodiment, the management of the wireless distributed application may include controlling the execution (e.g. start, stop, parallel computing, etc.) of the wireless distributed application across the wireless computing devices. Other management tasks performed by the wireless mobile device may include domain name service (DNS), security, liveness, readiness, etc.

In any case, the wireless computing device may manage execution of the wireless distributed application by communicating with one or more of the wireless computing devices. In an embodiment, each wireless computing device may include a cluster agent application that communicates with the cluster manager application of the wireless computing device. In this embodiment, the cluster agent applications of the wireless computing devices may be used by the cluster manager application for managing the execution of the wireless distributed application across the wireless computing devices.

For example, the wireless computing device may monitor the wireless distributed application by receiving updates from the wireless computing devices with regard to the execution of the components deployed thereto. As another example, the wireless computing device may determine a status of the component(s) of the wireless distributed application deployed to each wireless computing device (e.g. by requesting the status from the wireless computing devices or configuring the wireless computing devices to push the status periodically to the wireless computing device). As yet another example, the wireless computing device may send control instructions to the wireless computing devices to control the execution of the wireless distributed application across the wireless computing devices.

To this end, the wireless mesh network of wireless computing devices may be utilized to provide distributed execution of the wireless distributed application. Distributed execution of the wireless distributed application may optimize performance of the wireless distributed application. Further, this wireless mesh network may allow distributed processing of the wireless distributed application without use of the Internet, and thus without regard to whether the wireless computing devices have a connection to the Internet.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The following terminology, which may be used throughout the present description, may be defined as follows in some embodiments.

Wireless (ad hoc) network—a wireless ad hoc network, also known as a wireless mesh network or mobile ad hoc network (MANET), is a wireless network made up of radio nodes organized in a mesh topology. Each node forwards messages on behalf of the other nodes and each node performs routing. Ad hoc networks can "self-heal", automatically re-routing around a node that has lost power. Various network layer protocols are needed to realize ad hoc mobile networks, such as Distance Sequenced Distance Vector routing, Associativity-Based Routing. Ad hoc on-demand Distance Vector routing, and Dynamic source routing.

Application Service Unit (ASU)—a variant of the service-oriented architecture (SOA) architectural style that structures an application as a collection of loosely coupled services. In an application service unit architecture, services are fine-grained, and the protocols are lightweight. The benefit of decomposing an application into different smaller services is that it improves modularity. This makes the application easier to understand, develop, test, and become more resilient to architecture erosion. It parallelizes development by enabling small autonomous teams to develop, deploy and scale their respective services independently. It also allows the architecture of an individual service to emerge through continuous refactoring.

Mobile (smart) device—a mobile wireless electronic device, generally connected to other devices or networks via different wireless protocols that can operate to some extent interactively and autonomously such as smartphone, tablet, smart watch, car-based computer, internet of things (IoT) device, etc.

Range Extender—is a device that repeats the wireless signal from your router to expand its coverage.

Figure 2:
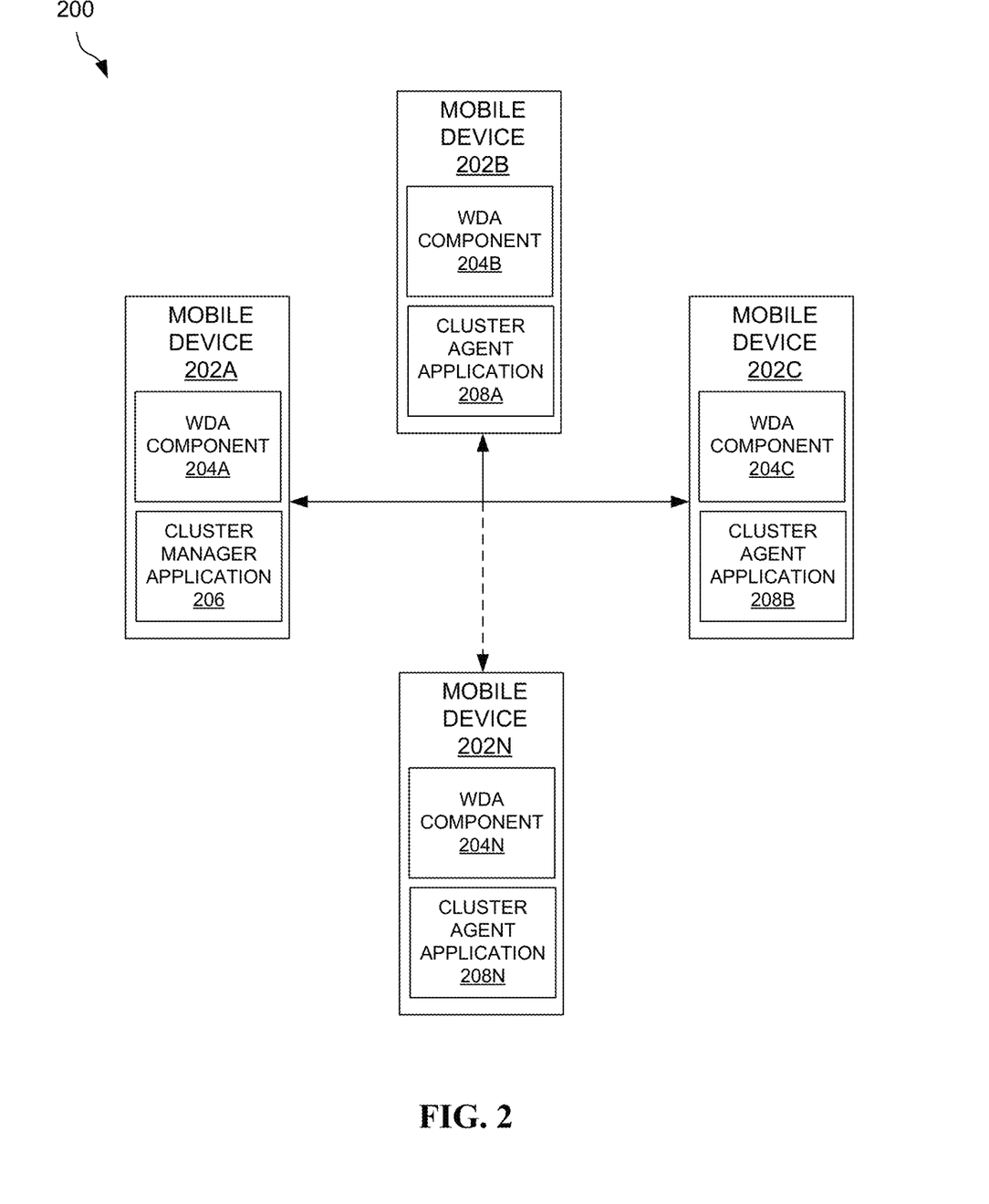
FIG. 2 illustrates a system for distributed application execution using a cluster of mobile devices in accordance with one embodiment.

FIG. 2 illustrates a system 200 for distributed application execution using a cluster of mobile devices in accordance with one embodiment. As an option, the system 200 may be implemented in the context of the details of the previous figure and/or any subsequent figure(s). For example, the method 100 of FIG. 1 may be carried out using the system 200 of FIG. 2. Of course, however, the system 200 may be implemented in the context of any desired environment. Further, the aforementioned definitions may equally apply to the description below.

As shown, the system 200 is a wireless mesh network that includes a plurality of mobile computing devices 202A-N. Each mobile computing device 202A-N includes a component (e.g. ASU) 204A-N of a wireless distributed application (WDA). The component 204A-N may be distinct across the mobile computing devices 202A-N, or one or more of the components 204A-N may be replicated (as instances) across one or more of the mobile computing devices 202A-N.

As also shown, a mobile computing device 202A of the mobile computing devices 202A-N includes a cluster manager application 206. The remaining mobile computing devices 202B-N include cluster agent applications 208B-N. Of course, it should be noted that other embodiments are contemplated in which multiple of the mobile computing devices 202A-N include in the cluster manager application 206, which coordinate with one another to manage execution of the WDA (e.g. such as a primary/secondary cluster manager applications or cluster manager applications that perform different management tasks).

The mobile computing device 202A uses the cluster manager application 206 to identify the WDA and then manage the WDA. For example, where the cluster manager application 206 is used to manage multiple different WDAs deployed across the mobile computing devices 202A-N and/or where the mobile computing devices 202A-N include components for multiple different WDAs, the cluster manager application 206 may identify the particular WDA for the purpose of performing one or more management tasks. The cluster manager application 206 communicates with the cluster agent applications 208B-N to manage the WDA.

Each component 204A-N of the WDA is deployed on its dedicated mobile computing device, and gets input messages and sends output messages to other relevant component 204A-N for following processing or storage. Since the mobile computing devices 202A-N may have a limited computing power, in most cases a single component 204A-N can be deployed at a single mobile computing device 202A-N to be able to serve multiple requests coming from other mobile computing devices 202A-N.

The system 200 may be implemented in various environments, such as outdoor team games, battlefield management, emergency management, wildland firefighting, law enforcement, construction, agriculture, forestry, hiking, among others.

With regard to deployment of the WDA across the mobile computing devices 202A-N, multiple scenarios are considered.

Manual Up-Front Deployment:

The entire WDA can be distributed offline with help of an external Up-Front Distributor application before the wireless mesh network is created. During setup, the Up-Front Distributor application presents the status of the overall WDA, monitors the WDA, and controls the WDA. The Up-Front Distributor application as part of the manual up-front deployment may have the appropriate user interface to manage, monitor and control deployment during setup of the WDA.

The WDA deployment includes the following steps:

1. Mobile computing device owner downloads and installs cluster agent application from an application store on his mobile computing device that is going to run one or more components of the WDA. Optionally, a system administrator implements the same for each mobile computing device with the Up-Front Distributor application.

2. Mobile computing device automatically joins a mesh in range.

3. System administrator uses the Up-Front Distributor application for creating a WDA configuration cluster topology, invoking WDA component automatic deployment of container images as per the WDA configuration cluster topology of relevant components on each device that run components, and deploying a cluster manager application from an application store on one or more mobile computing devices.

Note: Manual up-front deployment may be responsible as well for installing a WDA initiator application on a single device called WDA initiator for Ad hoc auto-deployment (described below).

Ad Hoc Auto-Deployment:

The entire WDA can be distributed from a single device called a WDA initiator to all other mobile computing devices:

1. At least one of the available mobile computing devices is the WDA initiator that stores the following deployment components: cluster manager application with deployment automation stack, cluster agent application, all required WDA components, and WDA configuration cluster topology template.

2. The WDA initiator communicates with each mobile computing device that joins a wireless mesh network and is going to run a component(s), as per the configuration cluster topology template.

3. The WDA initiator deploys a container image with cluster agent application and appropriate component(s) on the newly joined mobile computing device.

4. The WDA initiator deploys a container image with cluster manager application on one or more mobile computing devices.

Figure 3:
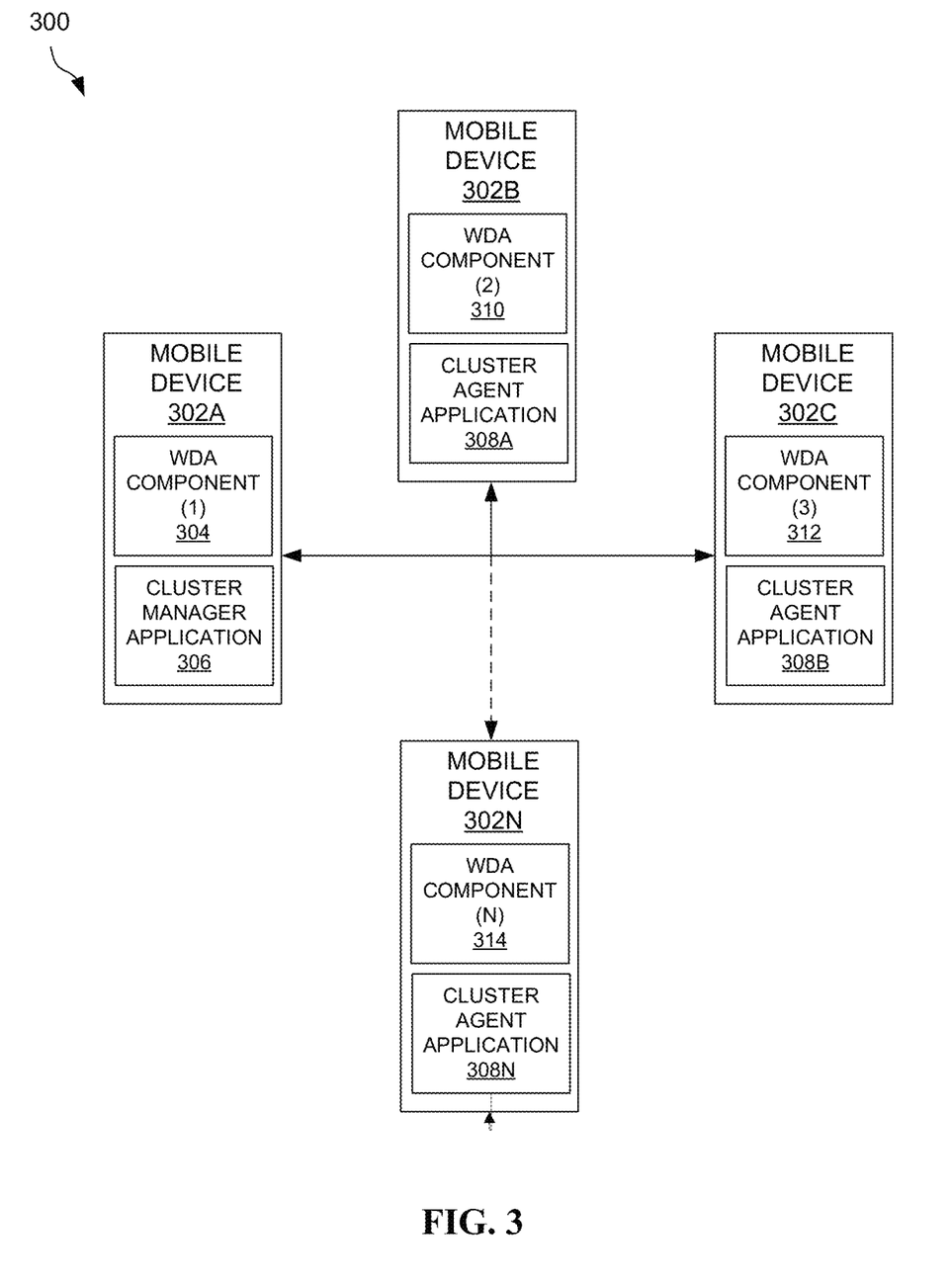
FIG. 3 illustrates a wireless mesh network of wireless computing devices where each component of a wireless distributed application is deployed to a different wireless computing device, in accordance with one embodiment.

FIG. 3 illustrates a wireless mesh network 300 of wireless computing devices where each component of a wireless distributed application is deployed to a different wireless computing device, in accordance with one embodiment. As an option, the wireless mesh network 300 may be implemented in the context of the details of the previous figure and/or any subsequent figure(s). For example, the wireless mesh network 300 may be one implementation of the system 200 of FIG. 2. Of course, however, the system 200 may be implemented in the context of any desired environment. Further, the aforementioned definitions may equally apply to the description below.

As shown, the wireless mesh network 300 includes a plurality of mobile computing devices 302A-N. Each mobile computing device 302A-N includes a different component (e.g. ASU) 304, 310, 312, 314 of a WDA.

As also shown, a mobile computing device 302A of the mobile computing devices 302A-N includes a cluster manager application 306. The remaining mobile computing devices 302B-N include cluster agent applications 308B-N. Of course, it should be noted that other embodiments are contemplated in which multiple of the mobile computing devices 302A-N include in the cluster manager application 306, which coordinate with one another to manage execution of the WDA (e.g. such as a primary/secondary cluster manager applications or cluster manager applications that perform different management tasks).

The mobile computing device 302A uses the cluster manager application 306 to identify the WDA and then manage the WDA. The cluster manager application 306 communicates with the cluster agent applications 308B-N to manage the WDA.

Figure 4:
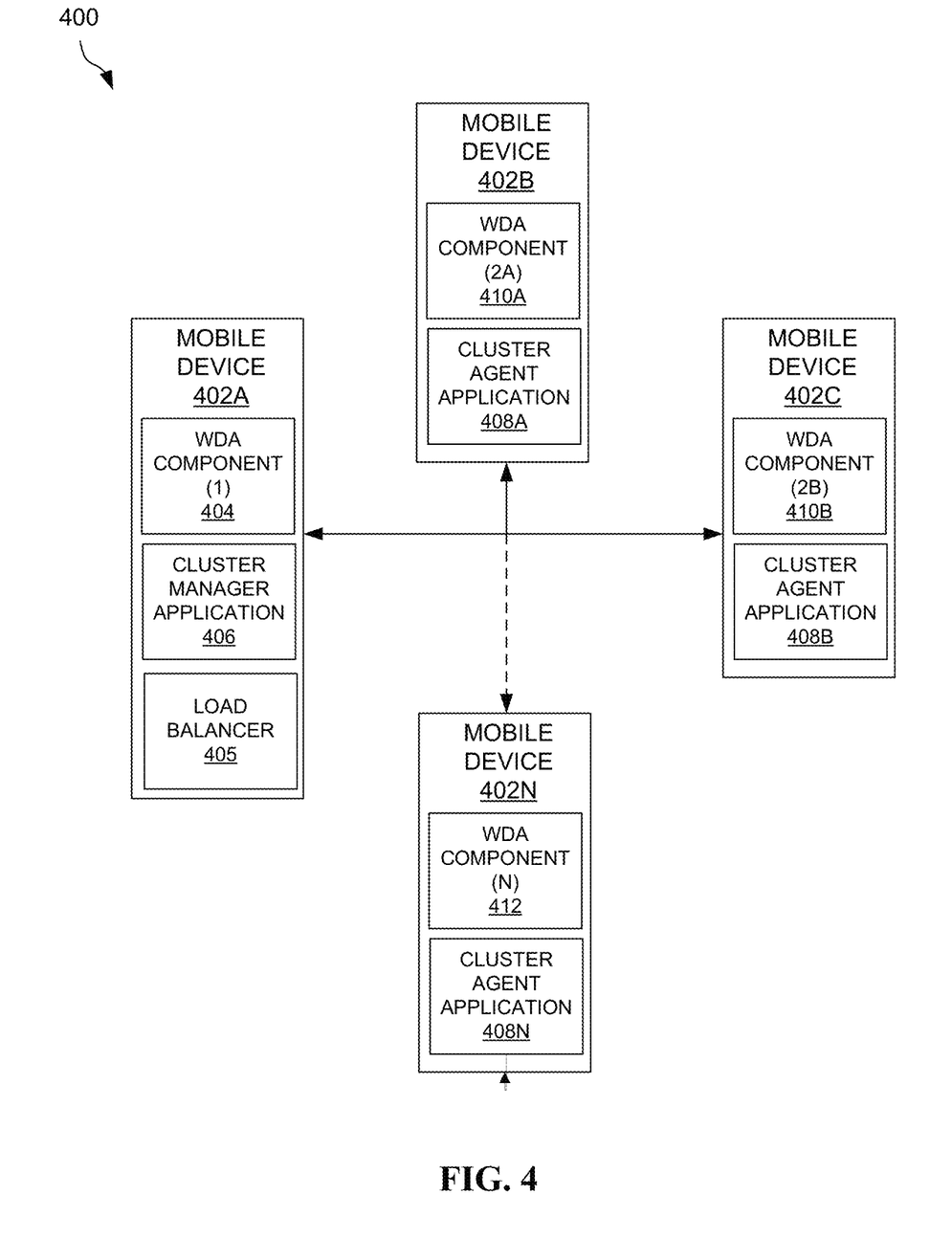
FIG. 4 illustrates a wireless mesh network of wireless computing devices where instances of a same component of a wireless distributed application are deployed to different wireless computing devices, in accordance with one embodiment.

FIG. 4 illustrates a wireless mesh network 400 of wireless computing devices where instances of a same component of a wireless distributed application are deployed to different wireless computing devices, in accordance with one embodiment. As an option, the wireless mesh network 400 may be implemented in the context of the details of the previous figure and/or any subsequent figure(s). For example, the wireless mesh network 400 may be one implementation of the system 200 of FIG. 2. Of course, however, the system 200 may be implemented in the context of any desired environment. Further, the aforementioned definitions may equally apply to the description below.

As shown, wireless mesh network 400 includes a plurality of mobile computing devices 402A-N. Each mobile computing device 402A-N includes a component (e.g. ASU) 404, 410A-B, 412 of a wireless distributed application (WDA). As shown, one or one or more of the components 410A-B may be replicated (as instances) across one or more of the mobile computing devices 402B-C.

In this embodiment, a load balancer 405 may be utilized by the wireless mesh network 400 to balance a load of the multiple instances of a same component 410A-B. The load balancer 405 may be deployed to one of the mobile computing devices 402A, as shown. This may or may not be the same device as the device having the cluster manager application 406, as described below.

As also shown, a mobile computing device 402A of the mobile computing devices 402A-N includes a cluster manager application 406. The remaining mobile computing devices 402B-N include cluster agent applications 408B-N. Of course, it should be noted that other embodiments are contemplated in which multiple of the mobile computing devices 402A-N include in the cluster manager application 406, which coordinate with one another to manage execution of the WDA (e.g. such as a primary/secondary cluster manager applications or cluster manager applications that perform different management tasks).

The mobile computing device 402A uses the cluster manager application 406 to identify the WDA and then manage the WDA. The cluster manager application 406 communicates with the cluster agent applications 408B-N to manage the WDA.

Figure 5:
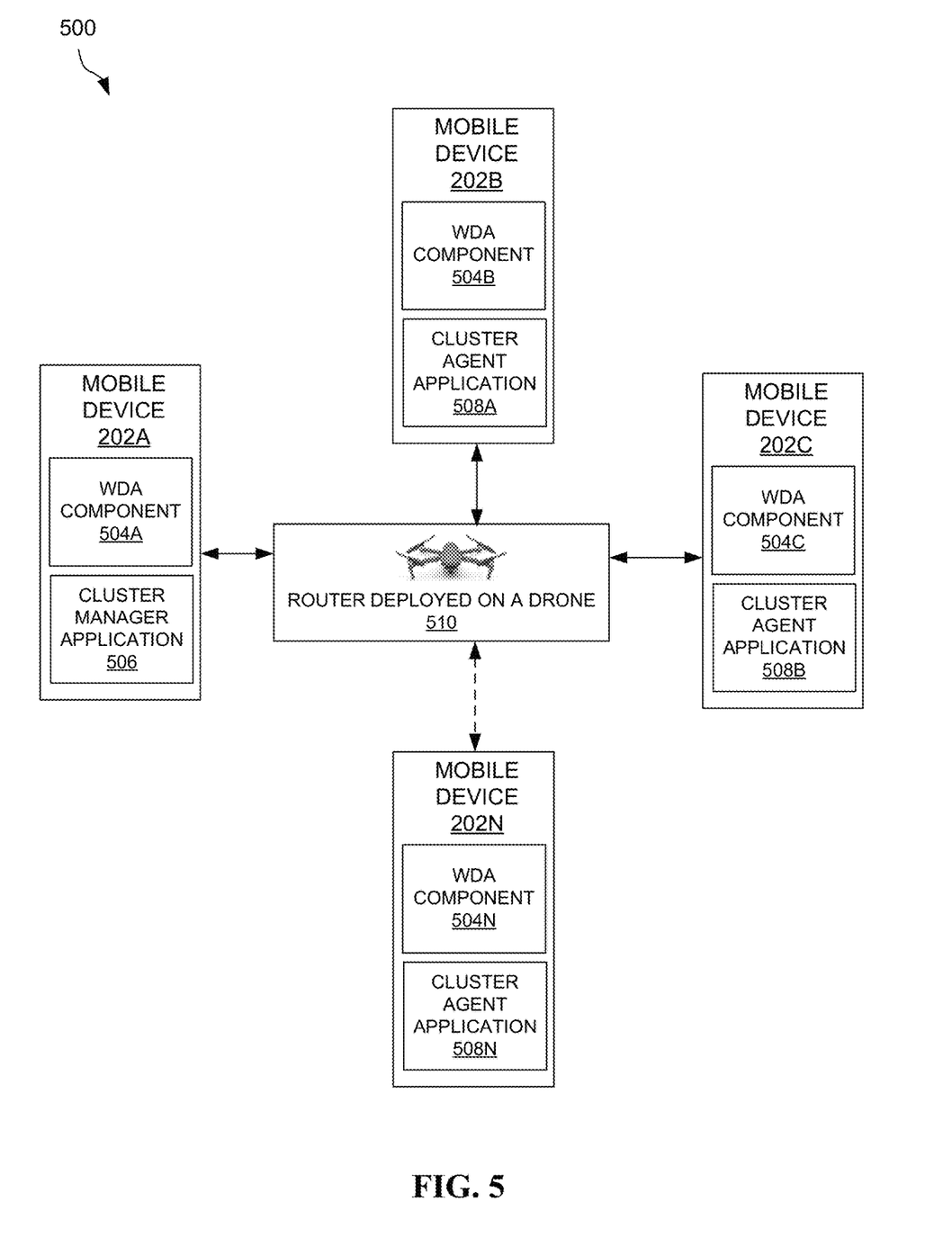
FIG. 5 illustrates a wireless mesh network of wireless computing devices that uses a router to improve a communication range, in accordance with one embodiment.

FIG. 5 illustrates a wireless mesh network 500 of wireless computing devices that uses a router to improve a communication range, in accordance with one embodiment. As an option, the wireless mesh network 500 may be implemented in the context of the details of the previous figure and/or any subsequent figure(s). For example, the wireless mesh network 500 may be one implementation of the system 200 of FIG. 2. Of course, however, the system 200 may be implemented in the context of any desired environment. Further, the aforementioned definitions may equally apply to the description below.

As shown, the wireless mesh network 500 includes a plurality of mobile computing devices 502A-N. Using a router, deployed at a drone 510, a communication range of the wireless mesh network 500 can increase significantly. This is because the router provides a shortest open communication path for all of the mobile computing devices 502A-N.

Figure 6:
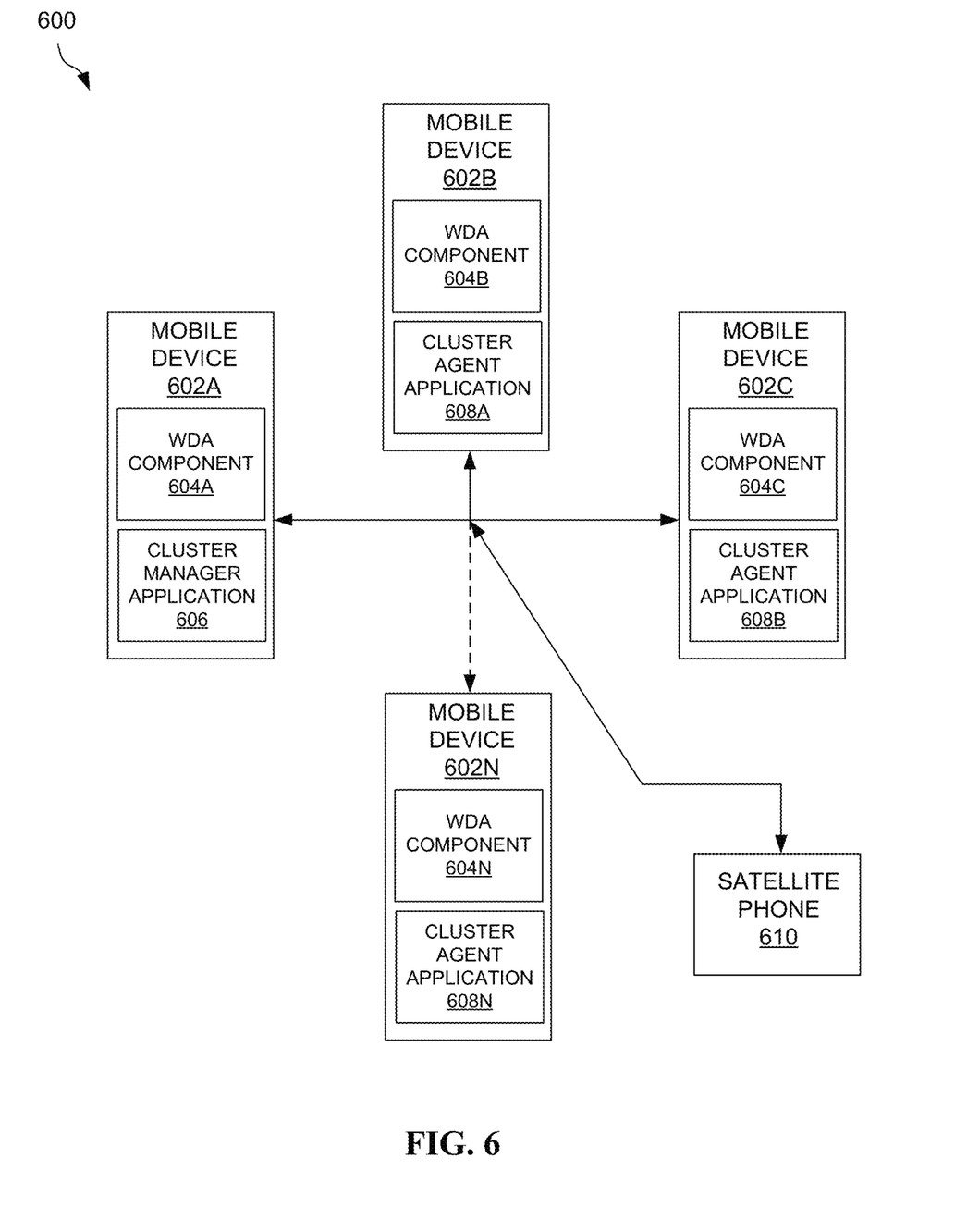
FIG. 6 illustrates a wireless mesh network of wireless computing devices that uses a satellite phone to connect to an outer internet, in accordance with one embodiment.

FIG. 6 illustrates a wireless mesh network 600 of wireless computing devices that uses a satellite phone to connect to an outer internet, in accordance with one embodiment. As an option, the wireless mesh network 600 may be implemented in the context of the details of the previous figure and/or any subsequent figure(s). For example, the wireless mesh network 600 may be one implementation of the system 200 of FIG. 2. Of course, however, the system 200 may be implemented in the context of any desired environment. Further, the aforementioned definitions may equally apply to the description below.

As shown, the wireless mesh network 500 includes a plurality of mobile computing devices 502A-N. The wireless mesh network 500 can be connected to an outer internet using a satellite phone 610 thus providing a maximum flexibility for distributed functionality of the WDA, and further providing remote persistence needs of the WDA.

Figure 7:
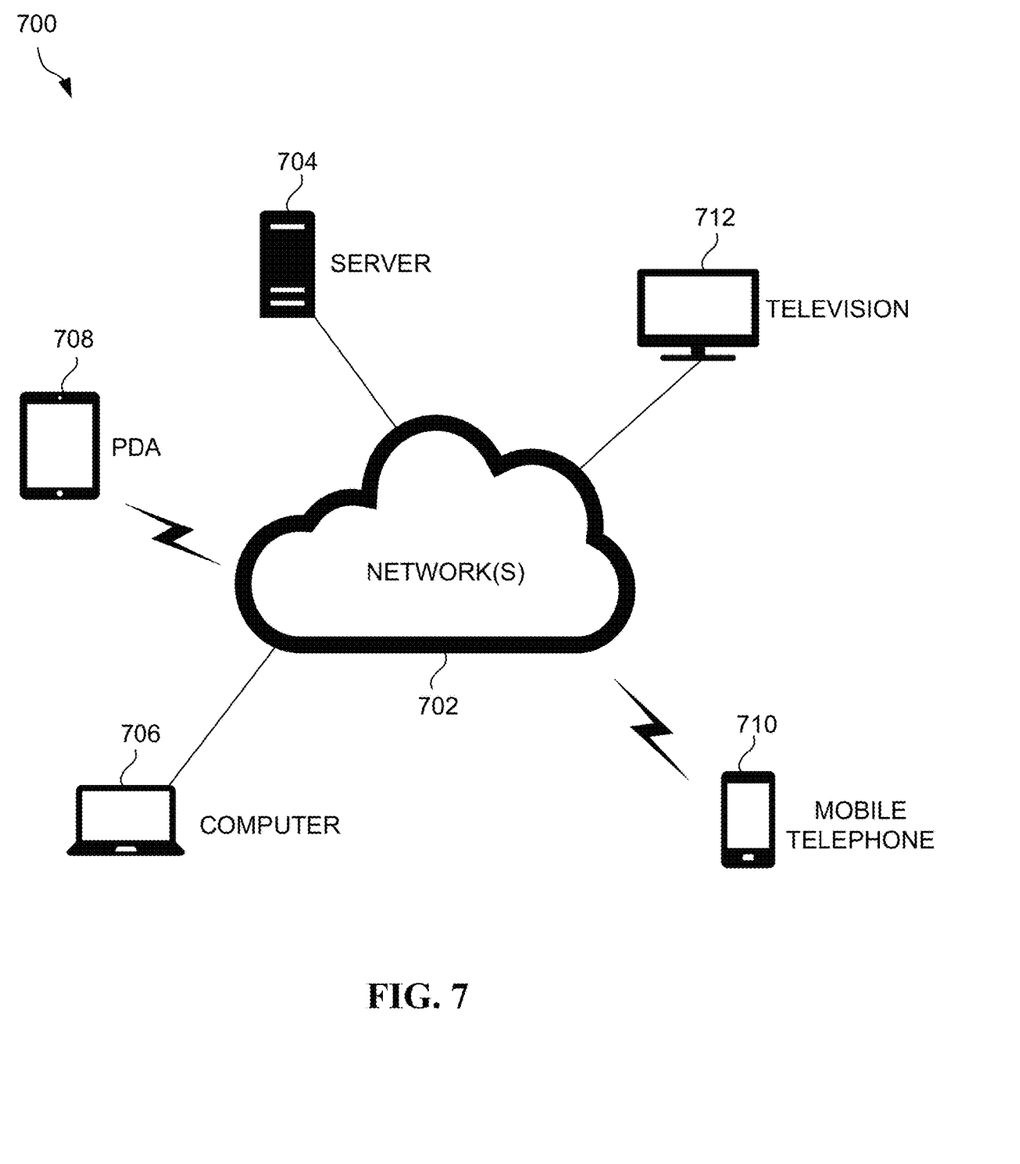
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
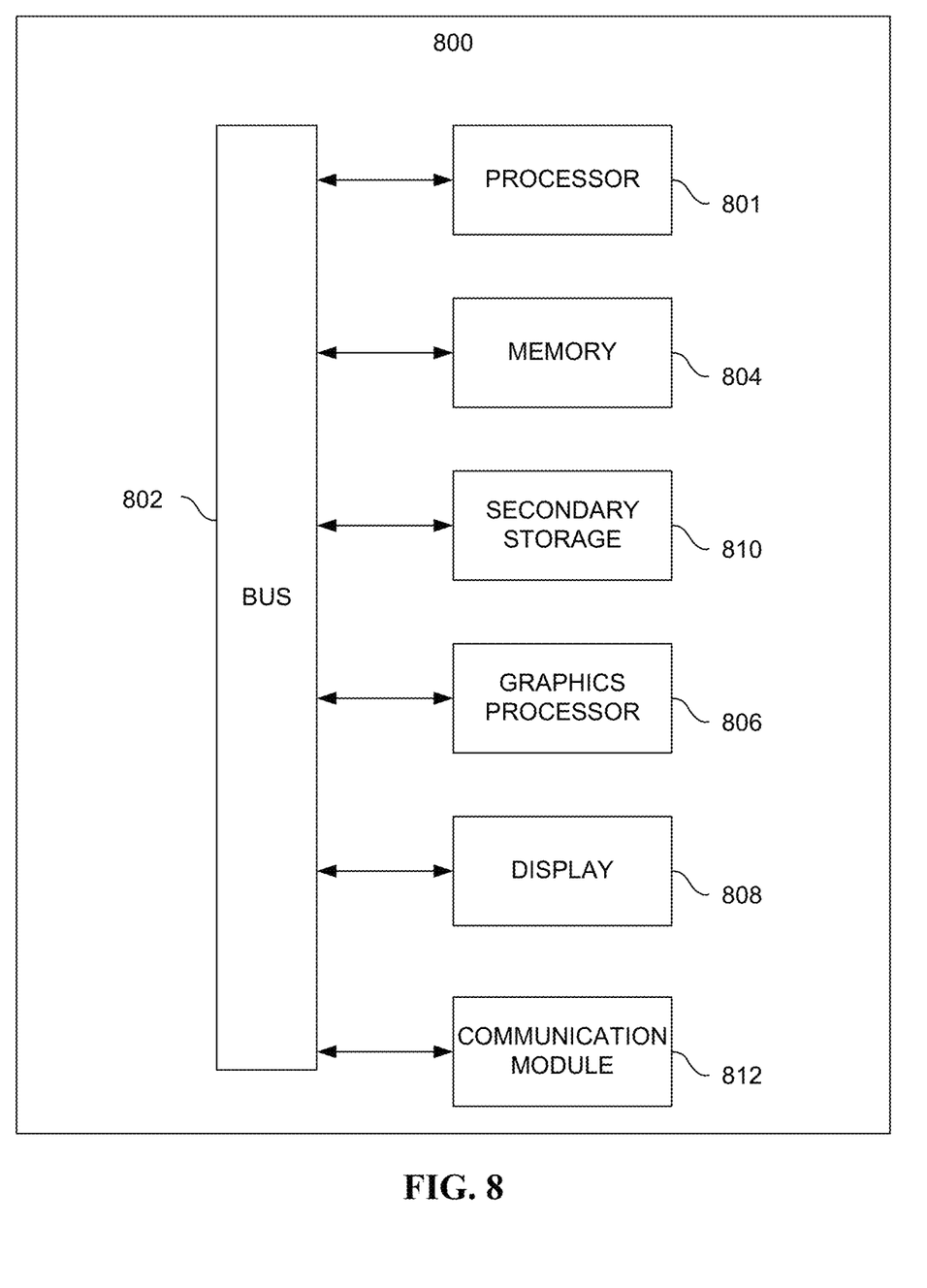
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a solid state drive (SSD), flash memory, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:

storing, by a wireless computing device, a cluster manager application with a deployment automation stack, a cluster agent application, a set of application service units (ASUs) each being a different sub-service of a wireless distributed application and each being configured to communicate with other ASUs in the set of ASUs, and a wireless distributed application configuration cluster topology template;

establishing communications, by the wireless computing device, with additional wireless computing devices that join a wireless mesh network of the wireless computing device and that are going to run the set of ASUs, as per the configuration cluster topology template;

deploying, by the wireless computing device to each of the additional wireless computing devices, a container image with the cluster agent application and a different ASU in the set of ASUs, such that the ASUs are distinct across the additional wireless computing devices;

identifying, by the wireless computing device included in the wireless mesh network, the wireless distributed application deployed across the additional wireless computing devices; and managing, by the cluster manager application of the wireless computing device, execution of the wireless distributed application across the additional wireless computing devices including:

determining, by the cluster manager application of the wireless computing device from the cluster agent application of each of the additional wireless computing devices in the wireless mesh network, a status of the ASU of the wireless distributed application executing on the additional wireless computing device, and sending, by the cluster manager application of the wireless computing device, control instructions to each cluster agent application of the additional wireless computing devices in the wireless mesh network to control the execution of the ASUs of the wireless distributed application across the additional wireless computing devices, wherein each of the ASUs of the wireless distributed application gets input messages and sends output messages to other relevant ASUs of the wireless distributed application for further processing or storage.

2. The non-transitory computer readable medium of claim 1, wherein the wireless mesh network uses a wireless technology.

3. The non-transitory computer readable medium of claim 2, wherein the wireless technology is one of Wi-Fi, Bluetooth, or Zigbee.

4. The non-transitory computer readable medium of claim 1, wherein the wireless mesh network uses a router deployed on a drone or an outer internet with a satellite phone to enable communications.

5. The non-transitory computer readable medium of claim 1, wherein the cluster manager application includes a user interface that allows a user of the wireless computing device to control one or more aspects of the management of the execution of the wireless distributed application.

6. The non-transitory computer readable medium of claim 1, wherein managing the execution of the wireless distributed application across the additional wireless computing devices includes:

determining a status of the wireless distributed application, and presenting the status of the wireless distributed application.

7. The non-transitory computer readable medium of claim 1, wherein the additional wireless computing devices make the wireless distributed application available for use by one or more consumers.

8. A method, comprising:

storing, by a wireless computing device, a cluster manager application with a deployment automation stack, a cluster agent application, a set of application service units (ASUs) each being a different sub-service of a wireless distributed application and each being configured to communicate with other ASUs in the set of ASUs, and a wireless distributed application configuration cluster topology template;

establishing communications, by the wireless computing device, with additional wireless computing devices that join a wireless mesh network of the wireless computing device and that are going to run the set of ASUs, as per the configuration cluster topology template;

deploying, by the wireless computing device to each of the additional wireless computing devices, a container image with the cluster agent application and a different ASU in the set of ASUs, such that the ASUs are distinct across the additional wireless computing devices;

identifying, by the wireless computing device included in the wireless mesh network, the wireless distributed application deployed across the additional wireless computing devices; and managing, by the cluster manager application of the wireless computing device, execution of the wireless distributed application across the additional wireless computing devices including:

determining, by the cluster manager application of the wireless computing device from the cluster agent application of each of the additional wireless computing devices in the wireless mesh network, a status of the ASU of the wireless distributed application executing on the additional wireless computing device, and sending, by the cluster manager application of the wireless computing device, control instructions to each cluster agent application of the additional wireless computing devices in the wireless mesh network to control the execution of the ASUs of the wireless distributed application across the additional wireless computing devices, wherein each of the ASUs of the wireless distributed application gets input messages and sends output messages to other relevant ASUs of the wireless distributed application for further processing or storage.

9. A wireless computing device included in a wireless mesh network of wireless computing devices, comprising:

a non-transitory memory storing instructions; and one or more processors in communication with the non-transitory memory that execute the instructions to perform a method comprising:

storing, by a wireless computing device, a cluster manager application with a deployment automation stack, a cluster agent application, a set of application service units (ASUs) each being a different sub-service of a wireless distributed application and each being configured to communicate with other ASUs in the set of ASUs, and a wireless distributed application configuration cluster topology template;

establishing communications, by the wireless computing device, with additional wireless computing devices that join a wireless mesh network of the wireless computing device and that are going to run the set of ASUs, as per the configuration cluster topology template;

deploying, by the wireless computing device to each of the additional wireless computing devices, a container image with the cluster agent application and a different ASU in the set of ASUs, such that the ASUs are distinct across the additional wireless computing devices;

identifying, by the wireless computing device included in the wireless mesh network, the wireless distributed application deployed across the additional wireless computing devices; and managing, by the cluster manager application of the wireless computing device, execution of the wireless distributed application across the additional wireless computing devices including:

determining, by the cluster manager application of the wireless computing device from the cluster agent application of each of the additional wireless computing devices in the wireless mesh network, a status of the ASU of the wireless distributed application executing on the additional wireless computing device, and sending, by the cluster manager application of the wireless computing device, control instructions to each cluster agent application of the additional wireless computing devices in the wireless mesh network to control the execution of the ASUs of the wireless distributed application across the additional wireless computing devices, wherein each of the ASUs of the wireless distributed application gets input messages and sends output messages to other relevant ASUs of the wireless distributed application for further processing or storage.

\* \* \* \* \*